(12) United States Patent
Wakihara et al.

(10) Patent No.: US 6,790,560 B2
(45) Date of Patent: Sep. 14, 2004

(54) POSITIVE ELECTRODE MATERIAL FOR LITHIUM SECONDARY BATTERY

(75) Inventors: Masataka Wakihara, 17-6, Sakuradai, Aoba-ku, Yokohama-shi, Kanagawa 227-0061 (JP); Yuji Tanjo, Yokohama (JP)

(73) Assignees: Nissan Motor Co., Ltd., Yokohama (JP); Masataka Wakihara, Yokohama (JP)

( * ) Notice: Subject to any disclaimer, the term of this patent is extended or adjusted under 35 U.S.C. 154(b) by 36 days.

(21) Appl. No.: 09/730,768

(22) Filed: Dec. 7, 2000

(65) Prior Publication Data

US 2001/0003632 A1 Jun. 14, 2001

(30) Foreign Application Priority Data

Dec. 10, 1999 (JP) .......................................... 11-352051

(51) Int. Cl.$^7$ ............................................. H01M 4/58
(52) U.S. Cl. ........................... 429/231.95; 429/231.9; 429/231.1; 429/224; 429/223; 429/231.5; 429/231.6
(58) Field of Search ........................ 429/231.95, 231.9, 429/231.1, 224, 223, 231.5, 231.6, 218.1

(56) References Cited

U.S. PATENT DOCUMENTS

| 5,700,597 A | 12/1997 | Zhong et al. ............... 429/218 |
| 5,759,717 A | 6/1998 | Amine et al. ............... 429/218 |
| 5,869,208 A * | 2/1999 | Miyasaka ................... 429/224 |

FOREIGN PATENT DOCUMENTS

| EP | 0 762 521 | 3/1997 |
| JP | 3-285262 | 12/1991 |
| JP | 10-116614 | 5/1998 |
| JP | 11-071115 | 3/1999 |

OTHER PUBLICATIONS

M. Hosoya et al., "The Defect Structure Model in Nonstoichiometric LiMn$_2$O$_{4-\delta}$", *J. Electrochem. Soc.*, vol. 144, No. 4, pp. 52–53, The Electrochemical Society, Inc., (Apr. 1997).

N. Hayashi et al., "Cathode, of LiMg$_{2-y}$O$_4$ and LiM$_{g2-y}$O$_{4-\delta}$ Spinel Phases for Lithium Secondary Batteries", *J. Electrochem. Soc.*, 146 (4), pp. 1351–1354, The Electrochemical Society, Inc. (1999).

* cited by examiner

Primary Examiner—Patrick Ryan
Assistant Examiner—Angela J. Martin
(74) Attorney, Agent, or Firm—Foley & Lardner LLP

(57) ABSTRACT

A positive electrode material for a lithium secondary battery includes a lithium manganese oxide having a spinel structure, expressed by one of the general formulae; Li$_x$M$_n$yO$_4$ (where $1 \leq x \leq 1.33$ and $3-x < y \leq 3.1-x$); and Li$_x$Mn$_y$M$_z$O$_4$ (where M is a metallic element other than Li and Mn, $1 \leq x \leq 1.33$, $3-x-z < y \leq 3.1-x-z$, and $o < z \leq 1.0$). The metallic element M may be at least one selected from the group consisting of Mg, Al, Cr and Ni. A lithium secondary battery includes at least a positive electrode of the positive electrode material.

18 Claims, 5 Drawing Sheets

POSITIVE ELECTRODE MATERIAL FOR LITHIUM SECONDARY BATTERY

BACKGROUND OF THE INVENTION

The present invention relates to material technology for lithium secondary batteries which can be used as power source for various devices such as computer, portable or cellular telephone, and portable audio device, and more specifically to positive electrode material for lithium secondary batteries and lithium secondary batteries having such positive electrode material.

As positive electrode material for lithium secondary batteries, there are known composite oxides, such as $LiCoO_2$ and $LiNiO_2$, including Li and transition metal such as cobalt, nickel and manganese.

Published Japanese Patent Specifications, Kokai Nos. H10(1998)-116614 and H11(1999)-71115 disclose spinel type lithium manganese oxides as positive electrode material.

SUMMARY OF THE INVENTION

The positive electrode material as disclosed in the above-mentioned Japanese Published Specifications has a structure to improve the durability by the substitution, for lithium or manganese in lithium manganese oxide, of another metal. Though such a structure is advantageous in durability, it is not competent enough to prevent undesired decrease in charge-discharge capacity of a battery, especially in initial charge-discharge capacity.

It is therefore an object of the present invention to provide positive electrode material for a lithium secondary battery and a lithium secondary battery having such positive electrode material capable of improving the lifetime of a lithium secondary battery without decreasing the charge-discharge capacity.

According to the present invention, a positive electrode material for a lithium secondary battery comprises: a lithium manganese oxide having a spinel structure, expressed by one of the general formulae;

$Li_xMn_yO_4$ (where $1 \leq x \leq 1.33$ and $3-x<y \leq 3.1-x$); and $Li_xMn_yMzO_4$ (where M is a metallic element other than Li and Mn, $1 \leq x \leq 1.33$, $3-x-z<y \leq 3.1-x-z$, and $0<z \leq 1.0$).

The metallic element M may be at least one selected from the group consisting of Mg, Al, Cr and Ni.

A lithium secondary battery according to the present invention comprises: a negative electrode comprising a negative electrode active material capable of retaining and releasing lithium ions; a nonaqueous electrolyte having ionic conductivity of lithium ions; and a positive electrode comprising a positive electrode active material comprising a composite oxide which comprises Li and which is capable of retaining and releasing lithium ions. The composite oxide is a lithium manganese oxide having a spinel structure expressed, by one of the above-mentioned general formulae.

DETAILED DESCRIPTION OF THE INVENTION

Figure 1:
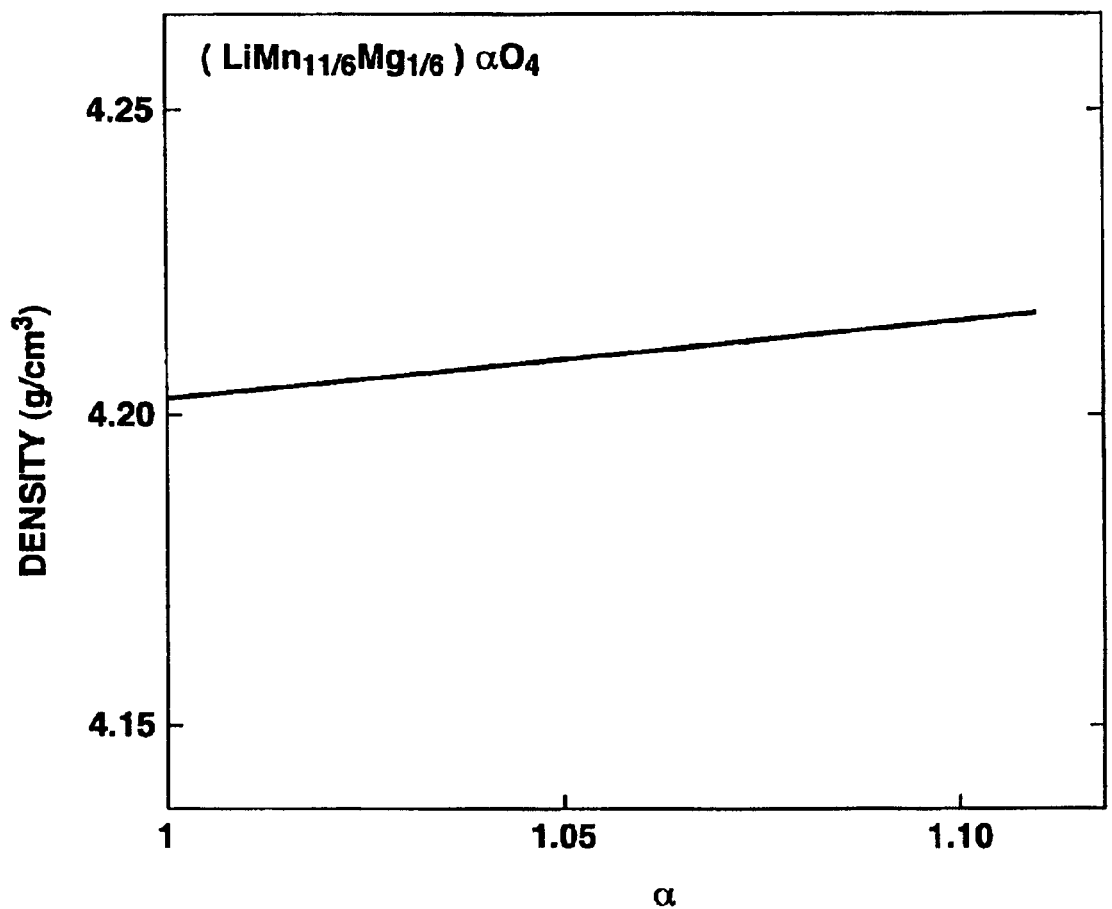
FIG. 1 is a graph showing a relationship between α in lithium manganese oxide $(LiMn_{11/6}Mg_{1/6})\alpha O_4$ prepared in a first practical example of the present invention, and the density.

According to the present invention, a positive electrode material for a lithium secondary battery includes at least a spinel type lithium manganese oxide expressed by the general formula $A_{na}B_{nb}O_4$ where A is Li, B comprises Mn, $1 \leq na \leq 1.33$, $3-na<nb \leq 3.1-na$.

When B is Mn, the formula is given by $Li_xMn_yO_4$ where x is in the range of 1~1.33 and y is in the range of $3-x<y \leq 3.1-x$. (In this case, x=na, and y=nb.) This spinel type lithium manganese oxide has a metal excess defect structure having excess Mn which occupies vacant 16c sites in the spinel crystal structure. The excess metals act to block Mn diffusion path and thereby restrain dissolution of Mn at higher temperatures. As a result, this spinel lithium manganese oxide according to the present invention can prevent unwanted decrease in the discharge capacity at higher temperatures, and prolong the lifetime of the lithium secondary battery.

When the second element B in the spinel $A_{n1}B_{n2}O_4$ comprises at least one third metal M in addition to Mn, the formula is; $Li_xMn_yM_zO_4$ where M is the third metal other than Li and Mn, $1 \leq x \leq 1.33$, $3-x-z<y \leq 3.1-x-z$, and $0<z \leq 1.0$. (In this case, x=na, and y+z=nb.) This spinel type lithium manganese oxide is excessive in metal with third metals other than Li and other than Mn, located at the vacant 16c sites in a manner to block Mn diffusion path. Thus, this metal rich structure prevents decrease of the discharge capacity at higher temperatures by reducing the dissolution of Mn, and thereby prolongs the lifetime of the lithium secondary battery.

If the amount of lithium increases and nears 1.33, the amount of manganese decreases and the average valence of Mn ion nears 4 from 3.5. If the valence becomes equal to four, the spinel oxide cannot function properly any longer as electrode material for a battery. Therefore, the upper limit for the number x is 1.33.

If the number z representing the amount of the third metal M becomes greater than one, the amount of Mn decreases likewise, and hence the spinel oxide becomes unable to function properly as electrode material. Therefore, the upper limit for z is set equal to 1.0.

If the total amount of the metallic elements x+y or x+y+z exceeds 3.1, the amount of excess metals becomes excessive, the fabrication becomes difficult, and the performance becomes poorer. Therefore, the upper limit of y for Mn is set at 3.1−x or 3.1−x−z.

Mg, Al, Cr, Ni or a combination of any two or more of these elements, as third metal M, can ensure the effect of the third metal.

PRACTICAL EXAMPLE 1

A first practical example employs, as an inventive example according to the present invention, lithium manganese oxide having a spinel type crystal structure, expressed by the general formula $Li_xMn_yM_zO_4$ where the third metal M is Mg, and the composition is $(LiMn_{11/6}Mg_{1/6})_{1.008}O_4$ (x=1.008, z=0.168, y=1.843, 3−x−z=1.824, 3.1−x−z=1.924). A comparative example is $LiMn_{11/6}Mg_{1/6}O_4$.

A compound $LiMn_{11/6}Mg_{1/6}O_4$ was synthesized by first mixing reagents of $Li2Co3$, $MnCO_3$ and $MgCO_3$ at a metal ratio of 6:11:1 (for Li:Mn:Mg), heating the mixture at 450° C. for 6 hours, further heating the sample at 600° C. for six hours, then heating the sample at 750° C. for three days in air, and cooling the sample slowly at a cooling rate of 1° C./min.

Samples of the thus-obtained compound $LiMn_{11/6}Mg_{1/6}O_4$ were calcined under controlled oxygen partial pressure, and then quenched. The compounds obtained by the calcination and quench were metal excess lithium manganese oxides expressed as $(LiMn_{11/6}Mg_{1/6})\alpha O_4$. The control of the oxygen partial pressure was carried out by varying an oxygen/nitrogen ratio, and the oxygen partial pressure $PO_2$ was controlled in the range of 100~0.1 kPa (1~$10^{-3}$ atm).

FIG. 1 shows a relationship between the density and α in the lithium manganese oxides $(LiMn_{11/6}Mg_{1/6})\alpha O_4$. As shown in FIG. 1, the measured density increases as α increases. This increasing characteristic of the density is an evidence for a metal excess structure in which excess metals are inserted in vacant sites. The density would decrease with increase in α if oxygen were deficient as expressed as $LiMn_{11/6}Mg_{1/6}O_4-\sigma$.

Then, by using $(LiMn_{11/6}Mg_{1/6})_{1.008}O_4$ among the metal rich lithium manganese oxides obtained by the oxygen partial pressure adjustment, as positive electrode material of the inventive example, and $LiMn_{11/6}Mg_{1/6}O_4$ obtained at the preceding step, as positive electrode material of the comparative example, test cells for lithium secondary batteries were prepared and the characteristics of these lithium secondary batteries were evaluated.

First, the procedure for fabricating each test lithium secondary battery is as follows: The positive electrode was prepared by mixing 75 wt % lithium manganese oxide as positive electrode active material, 20 wt % acetylene black as conducting material and 5 wt % PTFE (polytetrafluoroethylene) as binding material. Then, by using, as negative electrode, metallic lithium and, as electrolyte, EC/DEC containing 1 M $LiClO_4$ dissolved therein, the lithium secondary battery was produced for testing.

Figure 2:
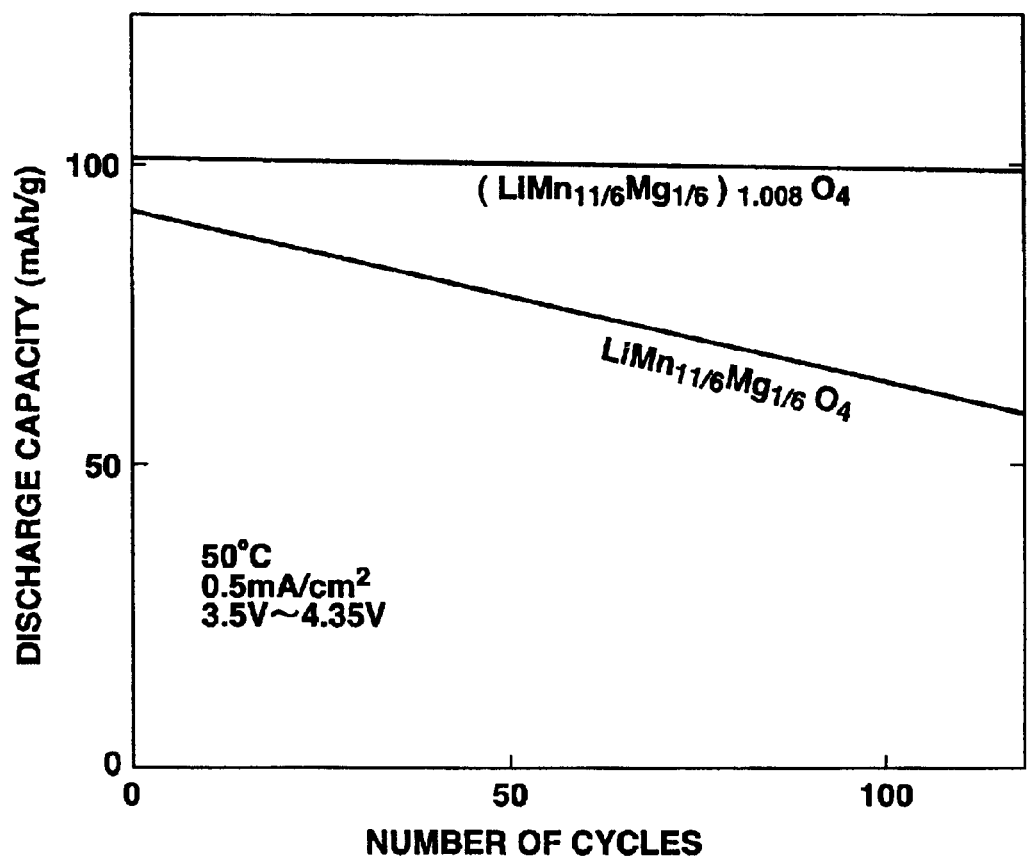
FIG. 2 is a graph showing high temperature charge-discharge characteristics of lithium secondary batteries using, as positive electrode material, $(LiMn_{11/6}Mg_{1/6})_{1.008}O_4$ in an inventive example of the first practical example, and $LiMn_{11/6}Mg_{1/6}O_4$ in a comparative example.

Then, the thus-prepared test lithium secondary batteries were examined to evaluate the charge-discharge cycle performance by constant current charge-discharge test at a temperature of 50° C., at a current density of 0.5 mA/cm² in a voltage range from 3.5V to 4.35V. FIG. 2 shows a relationship between the number of charge-discharge cycles and the discharge capacity obtained by the measurement.

PRACTICAL EXAMPLE 2

In a second practical example, the third metal M is Cr instead of Mg, and the composition of an inventive example according to the present invention is $(LiMn_{11/6}Cr_{1/6})_{1.008}O_4$. A comparative example is $LiMn_{11/6}Cr_{1/6}O_4$.

A compound $LiMn_{11/6}Mg_{1/6}O_4$ was synthesized by first mixing reagents of $Li2Co3$, $MnCO_3$ and $CrCO_3$ at a metal ratio of 6:11:1 (for Li:Mn:Cr), heating, as in the first practical example, the mixture at 450° C. for 6 hours, further heating the sample at 600° C. for six hours, then heating the sample at 750° C. for three days in air, and cooling the sample slowly at a cooling rate of 1° C./min.

Samples of thus-obtained compound $LiMn_{11/6}Cr_{1/6}O_4$ were calcined under controlled oxygen partial pressure, and then quenched as in the first practical example. The compounds obtained by the calcination and quench were metal excess lithium manganese oxides expressed as $(LiMn_{11/6}Cr_{1/6})\alpha O_4$.

Figure 3:
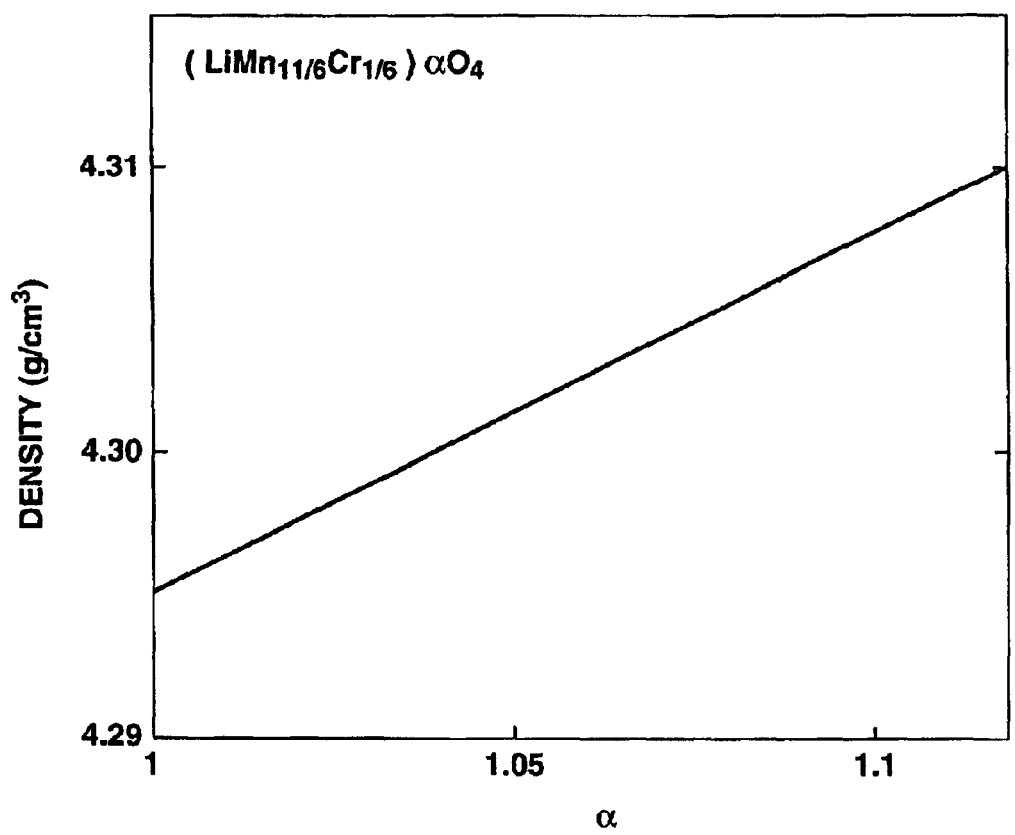
FIG. 3 is a graph showing a relationship between α in lithium manganese oxide $(LiMn_{11/6}Cr_{1/6})\alpha O_4$ prepared in a second practical example of the present invention, and the density.

FIG. 3 shows a relationship between the density and α in the lithium manganese oxides $(LiMn_{11/6}Cr_{1/6})\alpha O_4$. As shown in FIG. 3, the measured density increases as α increases as in the first practical example. This increasing tendency of the density confirms the metal excess structure in which excess metals of $(LiMn_{11/6}Cr_{1/6})\alpha O_4$ are located in vacant sites.

Figure 4:
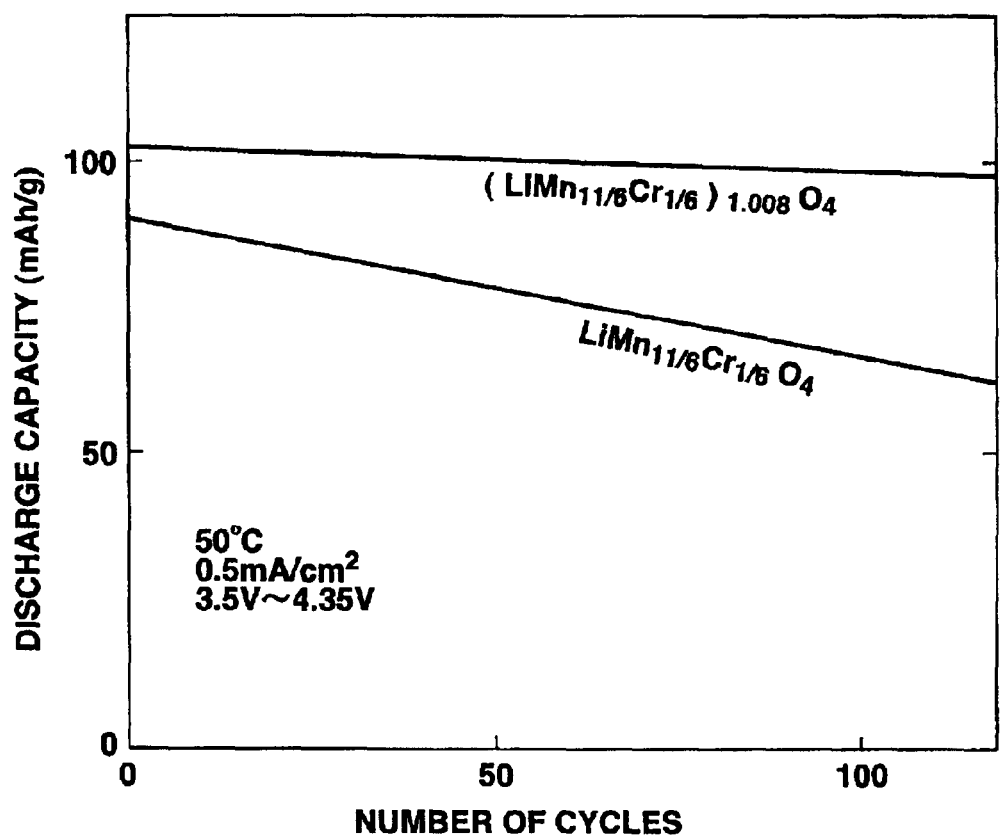
FIG. 4 is a graph showing high temperature charge-discharge characteristics of lithium secondary batteries using, as positive electrode material, $(LiMn_{11/6}Cr_{1/6})_{1.008}O_4$ in an inventive example of the second practical example and $LiMn_{11/6}Cr_{1/6}O_4$ in a comparative example.

Then, by using, as positive electrode material, $(LiMn_{11/6}Cr_{1/6})_{1.008}O_4$ in the inventive example, and previously obtained $LiMn_{11/6}Cr_{1/6}O_4$ in the comparative example, test cells for lithium secondary batteries were prepared as in the first practical example and the characteristics of these lithium secondary batteries were evaluated under the same conditions. FIG. 4 shows the results of the test.

PRACTICAL EXAMPLE 3

A third practical example employs lithium manganese oxides having a spinel type crystal structure, expressed by the general formula $Li_xMn_yO_4$. Among the lithium manganese oxides $Li_xMn_yO_4$, a sample of an inventive example has a composition $(Li_{1.1}Mn_{1.9})_{1.008}O_4$ (x=1.1088, y=1.9152, 3−x=1.8912, and 3.1−x=1.9912). A comparative example is $Li_{1.1}Mn_{1.9}O_4$.

A compound $Li_{1.1}Mn_{1.9}O_4$ was synthesized by first mixing reagents of $Li2Co3$ and $MnCO_3$ at a metal ratio of 1.1:1.9 (for Li:Mn), heating the mixture at 450° C. for 6 hours, further heating the sample at 600° C. for six hours, then heating the sample at 750° C. for three days in air, and cooling the sample slowly at a cooling rate of 1° C./min.

The thus-obtained compound $Li_{1.1}Mn_{1.9}O_4$ was calcined under controlled oxygen partial pressure as in the preceding examples, and then quenched. The compound obtained by the calcination and quench was metal excess lithium manganese oxide expressed as $(Li_{1.1}Mn_{1.9})_{1.008}O_4$.

Then, by using, as positive electrode material, the metal rich sample of $(Li_{1.1}Mn_{1.9})_{1.008}O_4$ in the inventive example, and the previously obtained sample of $Li_{1.1}Mn_{1.9}O_4$ as the comparative example, test cells for lithium secondary batteries were prepared and the characteristics of these lithium secondary batteries were evaluated for comparison.

First, the positive electrode of each test battery was prepared by mixing 85 wt % lithium manganese oxide as positive electrode active material, 5 wt % acetylene black as conducting material and 10 wt % PVDF (polyvinylidene fluoride) as binding material. Then, by using, as negative electrode, metallic lithium and, as electrolyte, PC/DMC containing 1 M LiPF6 dissolved therein, each lithium secondary test battery was produced.

Figure 5:
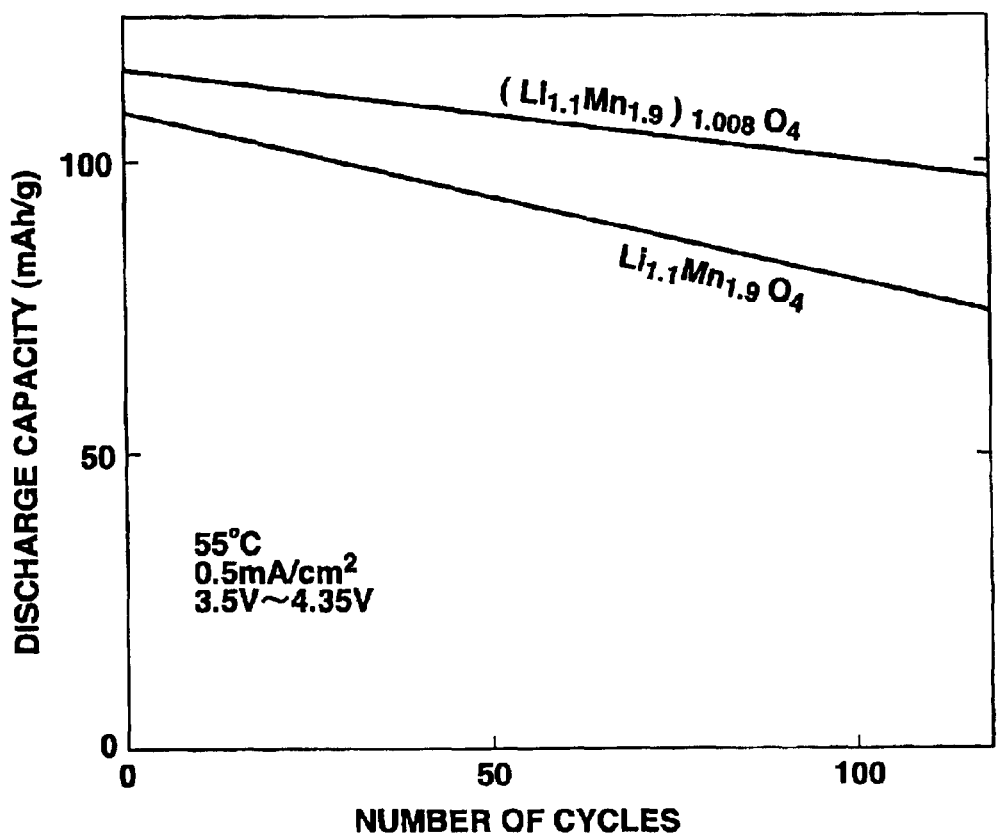
FIG. 5 is a graph showing high temperature charge-discharge characteristics of lithium secondary batteries using, as positive electrode material, 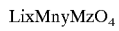$(Li_{1.1}Mn_{1.9})_{1.008}O_4$ in an inventive example of a third practical example according to the present invention and $Li_{1.1}Mn_{1.9}O_4$ in a comparative example.

Then, the thus-prepared test lithium secondary batteries were examined to evaluate the charge-discharge cycle performance by constant current charge-discharge test at a temperature of 55° C., at a current density of 0.5 mA/cm² in a voltage range from 3.5V to 4.5V. FIG. 5 shows a relationship between the number of charge-discharge cycles and the discharge capacity.

As evident from FIGS. 2, 4 and 5, the lithium secondary batteries using the positive electrode materials of metal rich lithium manganese oxides of spinel crystal structure according to the present invention are superior as the secondary battery especially in greater charge-discharge capacity and little or no decrease of the capacity in repetition of charge and discharge cycles at high temperatures equal to or higher than 50° C., as compared to the comparative examples using the lithium manganese oxides having no excess metals.

This application is based on a Japanese Patent Application No. 11-352051. The entire contents of this Japanese Patent Application No. 11-352051 with a filing date of Dec. 10, 1999 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A positive electrode material for a lithium secondary battery, comprising:
   a lithium manganese oxide having a spinel structure, expressed by a general formula:

$$Li_xMn_yO_4$$

where $1 \leq x \leq 1.33$ and $3-x<y \leq 3.1-x$, wherein the lithium manganese oxide has a metal excess structure containing excess manganese.

2. A positive electrode material for a lithium secondary battery, comprising:
   a lithium manganese oxide having a spinel structure, expressed by a general formula:

$$Li_xMn_yM_zO_4$$

where M is a metallic element other than Li and Mn, $1 \leq x \leq 1.33$, $3-x-z<y \leq 3.1-x-z$ and $0<z \leq 1.0$, wherein the lithium manganese oxide has a metal excess structure containing an excess of a metallic element other than Li.

3. The positive electrode material as claimed in claim 2, wherein the metallic element M comprises at least one selected from the group consisting of Mg, Al, Cr and Ni.

4. A lithium secondary battery comprising:
   a negative electrode comprising a negative electrode active material for retaining and releasing lithium ions;
   a nonaqueous electrolyte having ionic conductivity of lithium ions; and
   a positive electrode comprising a positive electrode active material comprising a lithium containing composite oxide for retaining and releasing lithium ions, the lithium containing composite oxide being a lithium manganese oxide having a spinel structure, expressed by a general formula:

$$Li_xMn_yO_4$$

where $1 \leq x \leq 1.33$ and $3-x<y \leq 3.1-x$, wherein the lithium manganese oxide has a metal excess structure containing excess manganese.

5. A lithium secondary battery comprising:
   a negative electrode comprising a negative electrode active material for retaining and releasing lithium ions;
   a nonaqueous electrolyte having ionic conductivity of lithium ions; and
   a positive electrode comprising a positive electrode active material comprising a lithium containing composite oxide for retaining and releasing lithium ions, the lithium containing composite oxide being a lithium manganese oxide having a spinel structure, expressed by a general formula:

$$Li_xMn_yM_zO_4$$

where M is a metallic element other than Li and Mn, $1 \leq x \leq 1.33$, $3-x-z<y \leq 3.1-x-z$ and $0<z \leq 1.0$, wherein the lithium manganese oxide has a metal excess structure containing an excess of a metallic element other than Li.

6. The lithium secondary battery as claimed in claim 5, wherein the metallic element M comprises at least one selected from the group consisting of Mg, Al, Cr and Ni.

7. A positive electrode material for a lithium secondary battery, comprising:
   a lithium manganese oxide having a spinel structure, expressed by a general formula:

$$Li_xMn_yO_4$$

where $1 \leq x \leq 1.33$ and $3-x<y \leq 3.1-x$, wherein said spinel structure comprises a metal excess defect structure in which excess Mn occupies vacant 16c sites.

8. A lithium secondary battery comprising an electrode according to claim 7.

9. A positive electrode material for a lithium secondary battery according to claim 7, consisting essentially of:
   a lithium manganese oxide having a spinel structure, expressed by a general formula:

$$Li_xMn_yO_4$$

where $1 \leq x \leq 1.33$ and $3-x<y \leq 3.1-x$.

10. A lithium secondary battery comprising an electrode according to claim 9.

11. A positive electrode material for a lithium secondary battery according to claim 7, wherein $1 \leq x \leq 1.33$ and $3-x<y<3.1-x$.

12. A positive electrode material for a lithium secondary battery according to claim 10.

13. A positive electrode material for a lithium secondary battery, comprising:
   a lithium manganese oxide having a spinel structure, expressed by a general formula:

$$Li_xMn_yM_zO_4$$

where M is a metallic element other than Li and Mn, $1 \leq x \leq 1.33$, $3-x-z<y \leq 3.1-x-z$ and $0<z \leq 1.0$, wherein said spinel structure comprises a metal excess defect structure in which an excess metal other than Li and other than Mn occupies vacant 16c sites.

14. A lithium secondary battery comprising an electrode according to claim 13.

15. A positive electrode material for a lithium secondary battery according to claim 13, consisting essentially of:
   a lithium manganese oxide having a spinel structure, expressed by a general formula:

$$Li_xMn_yM_zO_4$$

where M is a metallic element other than Li and Mn, $1 \leq x \leq 1.33$, $3-x-z<y \leq 3.1-x-z$ and $0<z \leq 1.0$.

16. A lithium secondary battery comprising an electrode according to claim 15.

17. A positive electrode material for a lithium secondary battery according to claim 13, wherein $1 \leq x \leq 1.33$ and $3-x<y<3.1-x$.

18. A lithium secondary battery comprising an electrode according to claim 17.

* * * * *